W. D. Mayfield,
Hay Loader.
No. 53,464.  Patented Mar. 27, 1866.
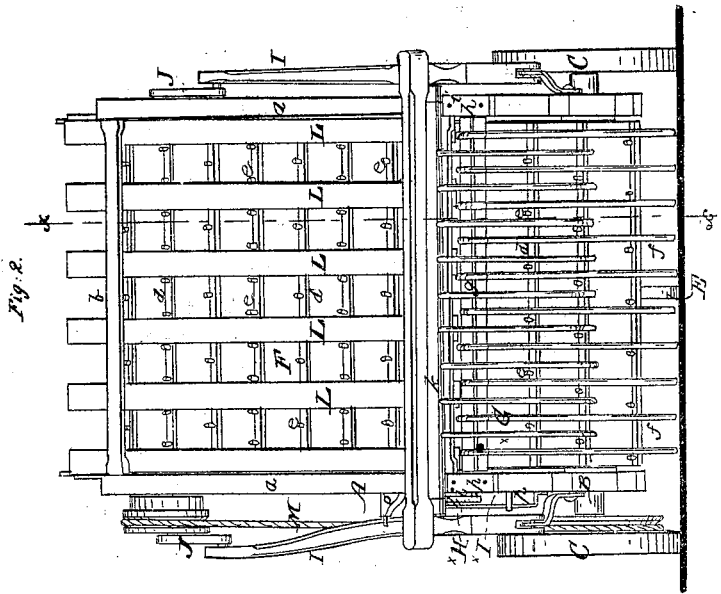
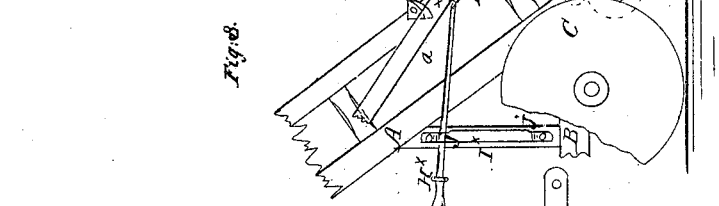
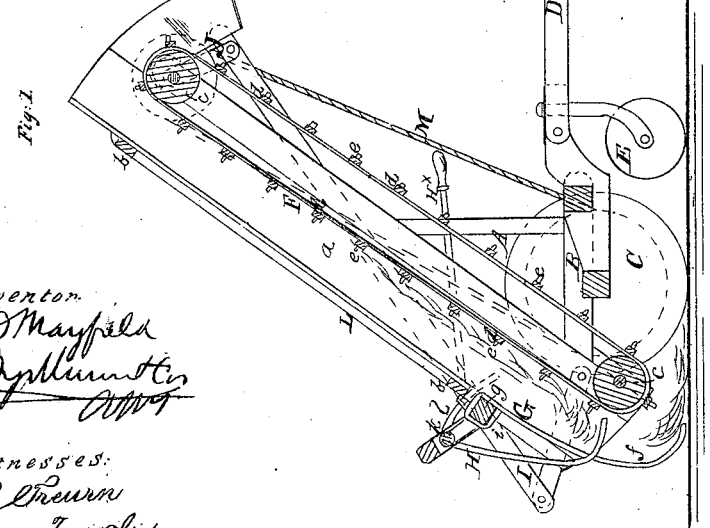
Inventor
W. D. Mayfield
Witnesses:

UNITED STATES PATENT OFFICE.

W. D. MAYFIELD, OF ASHLEY, ILLINOIS.

IMPROVEMENT IN MACHINES FOR RAKING AND LOADING HAY.

Specification forming part of Letters Patent No. 53,464, dated March 27, 1866.

*To all whom it may concern:*

Be it known that I, W. D. MAYFIELD, of Ashley, in the county of Washington and State of Illinois, have invented a new and Improved Hay-Loading Device; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a rear elevation of the same; Fig. 3, a side elevation of a portion of the same; Fig. 4, an under view of a portion of the same.

Similar letters of reference indicate corresponding parts.

This invention relates to a new and improved machine for raking up hay from the field and loading or depositing it upon a wagon or cart.

The invention consists in the devices for giving a reciprocating movement to the rake by which the hay is deposited upon the apron or elevator.

A represents a framing, which has an inclined position, and is connected to a horizontal framing B, supported by or mounted on wheels C C, and having a tongue, D, attached, the latter being supported by a caster-wheel, E, which admits of the ready turning of the device.

The inclined framing A is composed of two parallel sides, $a\ a$, connected by cross-pieces $b\ b$, and within said framing there is placed an endless apron, F, which works over rollers $c\ c$, one of which is at the upper and the other at the lower part of said framing. The endless apron F has slats $d$ attached transversely to it and provided with teeth $e$, and the lower part of said apron is within a short distance of the ground, the upper part being sufficiently high to deposit the hay upon the cart or wagon.

G is a rake, composed of curved wire teeth $f$, attached to a head, $g$, the ends of which are provided with journals $h$, the latter working in bearings $i\ i$ on the sides $a\ a$ of the framing A. One of the journals $h$ has a lever H$^\times$ attached to it which passes through a guide, I$^\times$, at the side of the framing A, said guide being provided with a notch, $j$, at its upper and lower end to hold the lever at either of said points, and secure the teeth of rake G in an elevated position free from the surface of the ground, or in a downward position so as to rake the hay or gather it at the lower part of the endless apron F as the machine is drawn along. (See more particularly Fig. 1.

H is a rake, constructed in the same manner as the rake G. This rake H has a reciprocating motion, and its head $k$ is attached to connecting-rods I I, the upper ends of the latter being secured to cranks J J at the ends of the shaft of the upper roller of the endless apron. By this means a reciprocating motion is given the rake H, and it has another movement given it for operating the teeth, which is accomplished by turning the head $k$. This is effected as follows: The head $k$ has a pendent rod, $l$, at one end of it, and to the under side of one of the connecting-rods I there are attached, by pivots $m$, two plates, K K', the free or disengaged ends of said plates crossing each other, (see Fig. 4,) and each having a notch, $n$, made in it to serve as a catch for the pendent rod $l$ and cause the latter to hold the rake-teeth in the two different positions designed for them, a spring, $l^\times$, bearing against said plates.

The operation is as follows: The tongue D of the device is attached to the rear of a wagon or cart, and as the latter is drawn along the rake G gathers or collects the hay at the lower part of the apron F, and the hay thus collected is taken up by the reciprocating rake H and deposited upon the apron or elevator F. As the rake H ascends its teeth are drawn or are kept toward the apron, the pendent rod $l$ being in the notch $n$ of the plate K', and just before said rake reaches the termination of its upward movement the plate K' strikes a projection, $o$, on the framing A, and is thrown outward free from the pendent rod $l$, and the latter, coming in contact with said projection $o$, is moved, and the teeth of rake H are thrown up from the endless apron or elevator, the teeth being in this position as the rake descends, and held in that position in consequence of the pendent rod $l$ catching into the notch of plate K. Just before the rake H reaches the termination of its downward movement the pendent rod $l$ comes in contact with a pin, $p$, of the framing A, and the teeth of rake H are turned down toward the apron so as to come in contact with the hay collected by rake G, the rake H then rising, while the teeth are held in position by the pendent rod $l$ engaging with plate K'. The rake G may be rendered inoperative at any time by moving the lever H$^\times$ down to the bottom of guide I$^\times$.

The endless apron F carries the hay upward and discharges it upon the cart or wagon, and the hay is prevented from being blown off from the apron by means of a shield composed of slats L, attached to the cross-pieces $b\ b$.

The endless apron F is operated by a band, M, from one of the wheels C on which the machine is mounted.

Having thus described my invention, I claim as new and desire to secure by Letters Patent—

The manner of giving the up-and-down motion to the teeth of the rake H, to wit: by means of the pendent rod $l$, notched pivoted plates K K', the projection $o$, and pin $p$, all arranged substantially as set forth.

W. D. MAYFIELD.

Witnesses:
   I. L. McBrelle,
   J. J. Van Dyke.